318-135 CROSS REFERENCE SEARCH ROOM

June 2, 1964     A. B. OLSON ETAL     3,135,880

LINEAR MOTION ELECTROMAGNETIC MACHINES
Filed Nov. 10, 1958

INVENTOR.
ARTHUR B. OLSON
BY JOHN K. STORM

J. V. Harmon
AGENT

United States Patent Office 3,135,880
Patented June 2, 1964

3,135,880
LINEAR MOTION ELECTROMAGNETIC
MACHINES
Arthur B. Olson and John K. Storm, Minneapolis, Minn.,
assignors to Tronics Corporation, Minneapolis, Minn.,
a corporation of Minnesota
Filed Nov. 10, 1958, Ser. No. 773,080
24 Claims. (Cl. 310—14)

This invention relates to linear motion electromagnetic machines and especially to linear electromagnetic motors. More particularly this invention provides a linear motion electromagnetic machine wherein the armature may be positioned at any selected point within the limits of its stroke by means of an external control.

One object of this invention is to provide a linear motion electromagnetic machine wherein a remote setting may be used to position the armature at any selected null point between the ends of the stroke of said armature.

Another object of this invention is to provide a linear motion electric motor which may have a stroke of any desired length.

Another object of this invention is to provide a linear motion electric motor wherein the force exerted on the armature is constant throughout substantially the entire length of travel of said armature.

It is still another object of this invention to provide a linear electric motor wherein the armature may be positioned at a continuous infinite number of null points along the length of its stroke by means of a remote setting.

It is yet another object of this invention to provide a linear electric motor wherein the current flow through the deflection windings is substantially constant regardless of the location of the null point.

It is still another object of this invention to provide linear electric motors of the class described which are suitable for use with either direct current or alternating current.

It is a still further object to provide a linear motion electromagnetic device of the class described which is useful as a current measuring or recording instrument.

These and other objects of the invention are described in the following specification in conjunction with the accompanying drawings in which.

Figure 1:
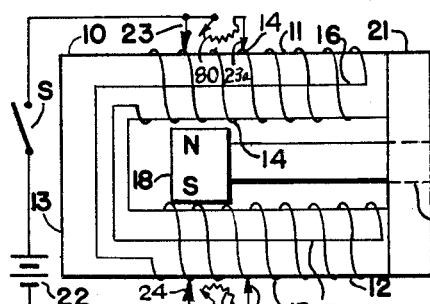
FIGURE 1 is a diagrammatic side elevation of one embodiment of this invention.

Referring to the drawings and particularly to FIGURE 1, there is shown a linear electric motor comprising a U shaped core 10 made of ferromagnetic material having two parallel legs 11 and 12 joined at one end by a center segment 13. A conductor is wound around each leg to form two parallel deflection coils 14 and 15. The last turn of coil 14 is connected to the first turn of coil 15 by a conductor 16 and the last turn of coil 15 is connected to the first turn of coil 14 by a conductor 17. Slidably mounted between the two deflection coils is an armature 18 comprising a permanent magnet oriented so that the flux lines emerging from its ends cut the conductors of each coil at right angles. The armature 18 and legs 11 and 12 define a pair of air gaps in which coils 14 and 15 lie as armature 18 is moved laterally between the legs. The armature is attached to one end of a connecting rod 19 made of nonmagnetic material which is adapted to slide through a bearing 20 in bearing plate 21. Bearing plate 21 is made of nonmagnetic material. The free end of connecting rod 19 is provided with a coupling 25 to which the object to be positioned may be attached. Plate 21 is conveniently attached to the free ends of core legs 11 and 12 by suitable connecting means. Current is supplied to the coils through a switch S by a power source such as a battery 22 whose terminals are connected to moveable taps 23 and 24, one tap being connected to coil 14 and the other tap being connected to coil 15. Each tap may be positioned at any point along the windings of the coil with which it is associated but the taps must be positioned opposite each other on a line perpendicular to the axis of the windings for reasons hereinafter explained. Stated another way, taps 23 and 24 must be fixed relative to one another while their position along the length of the deflection coils may be altered as desired.

The operation of the motor will now be described. By closing switch S current flows from battery 22 through switch S to tap 23, outwardly from tap 23 toward the ends of coil 14, through conductors 16 and 17, inwardly from the ends of coil 15, through tap 24 to battery 22.

At each air gap where the flux from armature 18 crosses the plane of the conductors there will be a force acting in accordance with the general formula $$F=BIL/10$$

where $F$=force in dynes
$B$=flux density in gauss
$I$=current in amperes and $L$=the length of conductor in air gap in centimeters.

The direction of the force is mutually perpendicular to the flux lines and the current passing through the conductors in the air gap. It will be noticed that the force therefore acts in a line parallel to the axis of connecting rod 19. Flux lines pass from the N pole of armature 18 into leg 11, through legs 11, 13, and 12 to the S pole of armature 18.

By choosing the correct direction of the windings in coils 14 and 15 the force acting between the windings and each pole of the armature may have the same direction at any given instant. The net force acting on the armature will then be twice the force acting across the air gap between each deflection winding and the magnetic pole associated with it. It will be seen since the current moves in opposite directions through the deflection windings on either side of each tap, the force on the armature is in the opposite direction on either side of the taps. By choosing the correct current direction between taps 23 and 24 the net force acting between the deflection windings 14 and 15 and the armature 18 is directed toward the taps whether the armature is to the left of the taps or is to the right of the taps. To change the position of the armature, the taps are positioned opposite each other at any desired point along the length of the deflection windings. To produce a uniform motion in the armature, both taps should slide simultaneously in either direction at a uniform speed along the windings as desired. It is apparent that if the taps are not positioned opposite one another on a line perpendicular to the axis of the windings, the force on each pole of the armature will be in the opposite direction, and a zero force zone will result along the path of travel in the area between the taps.

It may be seen, then, that when a current is passed through the coils, the magnet will travel to a point between the taps and a subsequent displacing force in either direction along its path of travel will be opposed by a restoring force in the direction of the taps. It may also be seen that at any point along the armature's path of travel, except in the vicinity of the tap, the deflecting force acting on the magnet will be substantially constant.

The force-displacement relationship in the vicinity of the tap may be explained in the following way. The force on the armature is constant until one edge of the armature passes the point where the current is traveling in opposite directions i.e. the point where the taps are located, then a force acting in the opposite direction will be set up between the coil and the armature reducing the net force to zero when the armature is directly opposite the taps. As the edge of the armature passes the tap, the counter force will develop slowly at first because of fringing flux. The position where the net force on the armature is zero may be called the null position or null point.

While the armature is illustrated as a permanent magnet 18, an electromagnet will serve equally well. Alternatively, a field winding may be placed around the center segment 13 of core 10, in which instance, the armature may be made of any ferromagnetic material and need not be permanently magnetized. The taps need not be movable taps, a plurality of fixed taps at any desired interval apart may be used in their place and a selector switch used to connect the battery across any two taps lying opposite each other. In this instance, the motion of the armature will be irregular when the current is switched from one set of taps to the next, but for most purposes this will not be objectionable if a sufficient number of fixed taps are used.

It is possible to omit the bottom deflection coil 15 and use only one deflection coil but it may be seen that under those conditions when the tap is not exactly between the ends of the coil, the current in the coil on either side of the tap will be of different magnitude. For this reason, it is preferred that two coils be used with their ends wired together in criss-cross fashion as described above. In addition, the use of two deflection coils gives more force on the armature by utilizing the flux in both air gaps.

Figure 2:
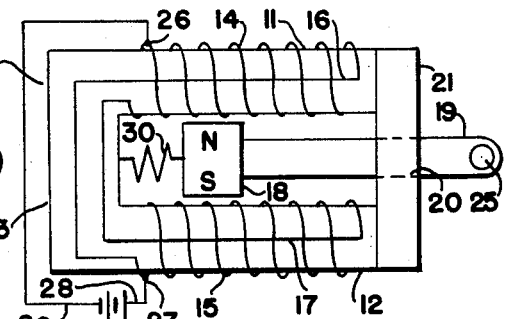
FIGURE 2 is a diagrammatic side elevation of another embodiment of this invention.

FIGURE 2 shows another embodiment of the invention which is similar in construction to that illustrated in FIGURE 1 except as explained below. The same numerals refer to the corresponding parts in FIGURES 1 and 2 except as noted below.

In FIGURE 2, current to the deflection windings 14 and 15 is supplied through conductors 28 and 29 to two fixed junctions 26 and 27 each of which is located at an end of one of the coils. The current passing through the coils will cause a force to be set up between the coils and the armature in the same manner as described above. A spring 30 is attached between the center segment 13 of the core and the armature 18 to return the armature toward the center segment 13 when the current is reduced. The current supplied across the input 31 may vary in intensity depending upon the magnitude of the current supplied by the particular source of power used and, as a result, the armature will be deflected to an extent dependent upon the strength of the current. It is apparent that the polarity of the deflection winding should be adjusted to produce a force on the armature which will oppose the force exerted by the spring 30. When a strong current is supplied to the input, the armature will be deflected greatly, when a smaller current is supplied the armature will be deflected a smaller amount. Spring 30 may be either a compression spring or a tension spring.

In FIGURE 2, while the deflection coils 14 and 15 are wired in parallel across the input 31, they may be wired in series if desired since there is no tendency for the current in the windings to vary as it would when movable taps are used as described above for the embodiment illustrated in FIGURE 1.

The restoring force produced by the spring 30 may alternatively be produced in any convenient way such as by gravity or by compressed air or the like.

Figure 3:
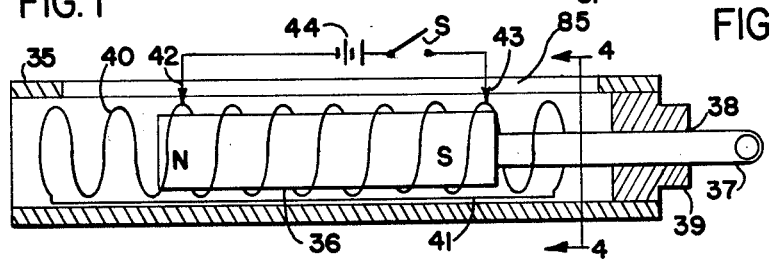
FIGURE 3 is a diagrammatic longitudinal sectional view of another embodiment of this invention.
Figure 4:
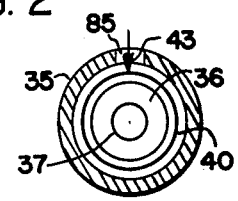
FIGURE 4 is a sectional view taken on the line 4—4 of FIGURE 3.

Referring now to FIGURES 3 and 4, there is shown a linear electric motor having an outer tubular housing 35 made of ferromagnetic material and an armature 36 inside the housing comprising a rod-shaped permanent magnet concentric with the housing 35 having a north pole at one end and a south pole at the other end. The armature is supported away from the walls of the housing by a connecting rod 37 which is attached to one pole of said armature and which slides along the axis of the housing 35 through a bearing 38 in the center of a bearing plate 39. The bearing plate is attached to one end of the housing 35. The connecting rod and bearing plate are both made of nonmagnetic material. A deflection coil 40 is provided adjacent the inside surface of the housing 35. The ends of the coil are connected together by means of conductor 41. Movable taps 42 and 43 supply current to the coil from a power source 44. The taps are able to slide longitudinally with reference to the deflection coil but are fixed with reference to each other so that when the position of one is changed along the length of the coil, the other is changed also. The taps may be held the correct distance apart by means of any convenient spacer, and the distance between the taps should be substantially the same as the distance between the poles of the armature 36. A slot 85 is provided in the top of the housing to allow the taps access to the coil.

In operation, the switch S is closed allowing a current to pass into the deflection coil through one tap and out through the other, the current on either side of each tap traveling in opposite directions. Flux lines passing from the poles of the armature cut the windings of the deflection coil 40 at substantially a 90 degree angle to the plane of their surface and complete the flux circuit through the housing 35. As in the previous embodiments, the force at each pole of the armature 36 will then be parallel to the path of travel of the armature and the direction of the force is reversed at the taps. When the armature is displaced either to the left or right of the taps a force will be established tending to return the poles of the armature directly opposite the taps. It is apparent, however, that the direction of the current must be correct or the armature will be repelled from the taps. The taps are fixed relative to one another and both moved along the deflection winding to produce axial motion in the armature 36.

Again, as in the embodiment shown in FIGURE 1, the movable taps may be replaced with a plurality of fixed taps, pairs of taps whose distances apart are the same as between the poles of the armature being selectively supplied with current from a suitable power source. A selector switch of any desired type may be used to switch the power from one pair of taps to the next. The armature 36 is illustrated as a permanent magnet but it is apparent that an electromagnet may be used if desired. Alternatively, the central windings of the deflection coil may be removed if desired and a field winding placed between the armature and the housing and between the two halves of the deflection coil. In this instance the armature may be made of soft iron or other soft magnetic material.

If desired, a second connecting rod may be attached to the end of the armature opposite the first. The connecting rod may be supported by a bearing similar to that supporting the first connecting rod.

Figure 5:
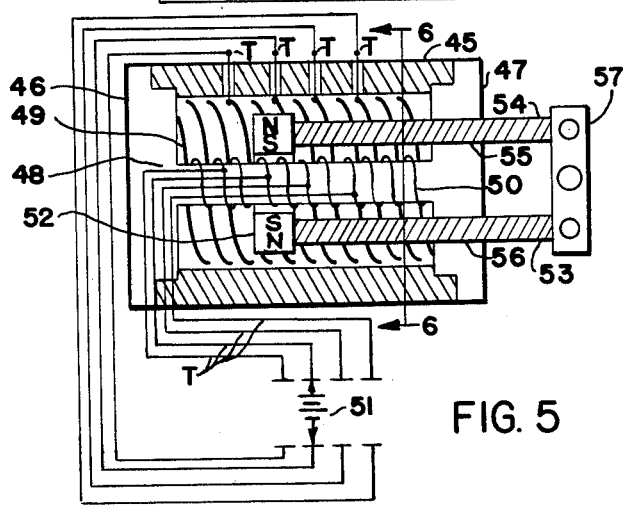
FIGURE 5 is a longitudinal sectional view of another form of the invention.
Figure 6:
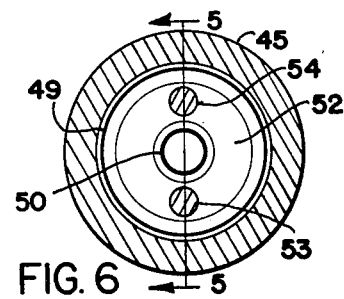
FIGURE 6 is a sectional view taken on the line 6—6 of FIGURE 5.

Refer now to FIGURES 5 and 6. There is shown a motor having a tubular housing 45 made of ferromagnetic material provided with plates 46 and 47 covering either end, a rod-shaped core 48 which is concentric with the outer housing 45 and whose ends are attached to the center of the end plates 46 and 47. Center core 48 is also made of ferromagnetic material. Adjacent to the inside surface of the housing 45 is a first deflection coil 49 whose axis coincides with that of the housing 45. Wound around the outside surface of center core 48 is a second deflection coil 50 whose ends are connected to the opposite end of the deflection coil 49 in criss-cross fashion by means of two conductors which are not shown. A plurality of taps T are fixed at regular intervals along each coil, and current from a suitable power source 51 is supplied to any selected pair of taps, both of which lie in a plane intersecting the axis of the core 48 at a right angle. Slidably mounted between the housing 45 and the core 48 is an armature 52 comprising a ring-shaped permanent magnet which is magnetized such that there exists a magnetic pole along the inside circumference and a magnetic pole along its outside circumference. Flux lines emerging from the outside and inside of the armature cut the windings of both deflection coils at substantially right angles. The armature may be supported away from the coils by attachment to connecting rods 53 and 54 which are made of nonmagnetic material and pass through bearings 55 and 56 and whose free ends are connected together by a coupling 57. The load to be positioned may be attached to the coupling 57.

When a current is supplied to any selected pair of taps, current passes outwardly from one tap toward the ends of the deflection winding, inwardly from the ends of the other deflection winding and then completes the circuit through the other tap. Flux lines from the armature in cutting the current-carrying windings of coils 49 and 50 cause a force to be exerted on the armature along lines parallel to the path of travel of the armature for reasons explained above. By using the appropriate polarity at the taps, the force exerted on the armature may be directed toward the taps whether the armature is positioned to the left or the right of the taps and thus the armature, when it is free to move, will always take a position between the taps. By applying a voltage across any pair of taps selected the armature may be moved to any desired position.

Figure 7:
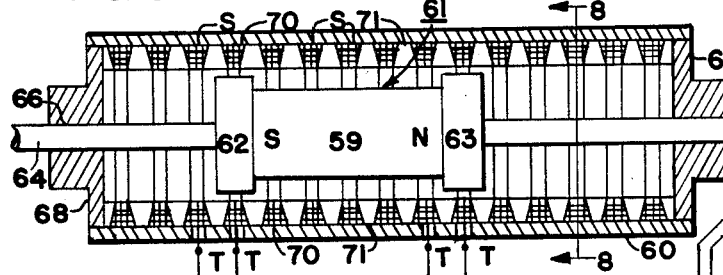
FIGURE 7 is a longitudinal section of another embodiment of this invention.
Figure 8:
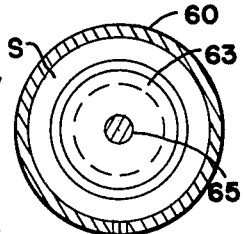
FIGURE 8 is a sectional view taken on line 8—8 of FIGURE 7.

Referring now to FIGURES 7 and 8, there is shown a linear electric motor having an outer tubular housing 60, made of ferromagnetic material and a spool-shaped armature 61 inside the housing and concentric therewith having a center section 59 comprising a rod-shaped permanent magnet with a north pole at one end, a south pole at the other end and provided with cylindrical pole pieces 62 and 63 at either end whose diameters are larger than that of the center section 59. The axis of the pole pieces and center section all coincide with the axis of the housing 60. Attached to either pole piece of the armature are connecting rods 64 and 65 made of nonmagnetic material, slidable through bearings 66 and 67 respectively in bearing plates 68 and 69 which are in turn attached to the ends of housing 60. The object to be positioned may be connected to the free end of either of the connecting rods. Bearing plates 68 and 69 are made of nonmagnetic material. Concentric with the housing 60 between the housing and the armature is a deflection coil 70 whose ends are connected together by a conductor similar to line 41 in FIGURE 3. The deflection coil 70 is divided into a plurality of spiral windings S, adjacent spirals joined in series by means of conductors which are not shown. Between adjacent spirals are provided rings 71 of ferromagnetic material whose width at their inside diameter is greater than their width at their outside diameter for reasons hereinafter explained. At each spiral is provided a fixed tap T which leads out through the housing 60. The conductors running from pairs of taps T whose distances apart are the same as between the poles of the armature may be selectively supplied with current from a suitable power source. A selector switch 75 of any desired type may be used to switch the current from one pair of taps to the next.

The general principles of operation are the same as described above for the embodiment illustrated in FIGURES 3 and 4, that part of the operation which is different will be described below.

The armature is illustrated as a permanent magnet but it is apparent that an electromagnet may be used if desired. Alternatively, several of the center spirals S of the deflection coil 70 may be removed, if desired, and a field winding placed between the armature and the housing and between the two halves of the deflection coil. In this instance, the armature may be made of soft iron.

It may be shown that when the device is employed as a motor, the pole pieces 62 and 63 made of soft iron and the center sections made of Alnico V, or other permanent magnet material, the flux density at the surfaces of the poles will ideally be at about half the saturation value while the center section 59 operates at the point of maximum energy on its demagnetization curve.

The rings 71 are used to increase the flux density in the air gap between the armature poles and the deflection coil for a given number of field ampere-turns. A further improvement in flux density is made possible by using rings having a greater inside width than outside width. Because there is a greater amount of material in a flat washer at the outside diameter than at the inside diameter, a given flux density will saturate the flat rings at their inside diameter but not at their outside diameter. The wedge shaped rings 71 illustrated in FIGURE 7 may be given an inside and outside width which will allow them to be saturated throughout. An air gap must be provided between the inside edges of adjacent rings to provide a high reluctance axial flux path.

It may be seen in the embodiment illustrated in FIGURES 7 and 8 that the rings 71, if desired, may be made integral with the housing 60. Also, the inside diameter of the rings may be smaller than the inside diameter of the windings.

While rings 71 in FIGURES 7 and 8 are illustrated as wedge-shaped, in applications where simplicity of design is an important factor, flat rings are preferred.

The embodiments described so far have been designed to keep the currents in the deflection windings equal on either side of the taps, such as 23 and 24 of FIGURE 1. If the currents on either side of the taps are unequal, the position of the null point will be shifted in the direction of the winding carrying the weaker current. Thus a means of locating null points between tap positions can be provided by adjusting the current ratio on either side of the taps. By using this vernier action, it is possible to position the armature at any point within the stroke of the motor even though only a small number of taps are provided. Since only the deflection windings that are in the air gap opposite the armature pole pieces actually cause a force on the armature, it is only necessary to adjust the current ratio in the windings immediately to the left and right of taps 23 and 24, FIGURE 1. This might be done by providing additional pairs of taps, such as placing a pair a distance to the left of taps 23 and 24 equal to the armature width and/or the same distance to the right of taps 23 and 24 as at 23a and 24a. Variable resistors 80 and 81 connected between taps 23 and 24 and taps 23a and 24a respectively would shunt some of the current around the deflection windings at the side of taps 23 and 24 and the position of these variable resistors 80 and 81 could be adjusted to give the desired vernier action.

In the embodiment illustrated in FIGURE 2, the spring 30 is unnecessary when a restoring force is provided by the object or mechanism to be positioned. It should again be emphasized that the force acting on the armature is constant throughout its stroke and further that the stroke may be of any length. If desired, the armature may run on a track instead of being supported by a connecting rod which in turn passes through a bearing. Track suspension may be especially useful when the stroke required is over about two or three feet in length. The term "bearing support" as used herein with reference to the armature is meant to include support by a track.

By changing the direction of the current input in any of the embodiments of the invention described, it can be seen that the armature may be made to travel first to the left and then to the right. The current direction may be reversed either manually or automatically. In applications, for example, which require a reciprocating motion, means may be provided to sense the armature as it nears one end of its stroke and thereupon reverse the direction of the current input so that the armature will reverse directions and travel toward the opposite end of the deflection coil.

The embodiments illustrated in FIGURES 1 and 2 will operate less efficiently than the other embodiments because the flux produced by the armature cuts across only a part of the windings. To increase the efficiency and performance in these embodiments, the air gap between the windings on each coil and the armature should be reduced to a relatively small size and the armature may be made to project around three sides of each core leg so that more of the wire on the deflection windings will be cut by the flux from the armature. To accomplish this end, the armature may be made with a U shaped notch at each pole, the legs of the U lying adjacent the sides of deflection windings.

While the invention is illustrated in the figures for use with direct current, alternating current may be used to supply power by replacing the permanently magnetized armature with a laminated electromagnet. The field winding used to produce a flux in the armature may be attached to the core or may be wound directly about the armature. When alternating current is used, means must be provided to keep the field flux in phase with the current in the deflection windings. Means whereby this is accomplished will be apparent to those skilled in the art.

In some instances it may be convenient to hold the armature stationary and attach the element to be positioned by the motor to the core or housing. The term "movable" when used herein with reference to the armature, means movable with respect to the housing or core.

The invention herein described is not limited for use in applications requiring perfect straight line motion. The armature may, alternatively, be pivotally supported, in which instance the core or housing may be arcuate in shape, corresponding to the path of travel of the armature about its pivot point. The term "linear" as herein used is meant to include both perfect straight line motion and also motion through an arc.

While the invention is principally useful as a motive power device it may also be used in other ways. For example, the embodiment illustrated in FIGURE 2 may be used for a current sensing instrument or for an oscillograph or the like. It may be shown that the displacement of the armature will vary linearly with the current, making it especially valuable for use as a meter.

While certain preferred embodiments of the invention have been illustrated and described in detail, it is to be understood that changes may be made therein and the invention embodied in other structures. It is not, therefore, the intention to limit the patent to the specific construction illustrated, but to cover the invention broadly in whatever form its principles may be utilized.

We claim:

1. A linear motion electromagnetic machine comprising in combination a tubular housing made of a ferromagnetic material, an armature mounted within said housing, said armature being capable of producing a magnetic flux and mounted for back-and-forth motion along the axis of said housing, said armature including an elongated center section, a pole piece at each end, each of said pole pieces having a greater cross sectional area than said center section, a deflection coil comprising a plurality of spiral windings joined together in series by means of conductors joining ends of adjacent windings, said deflection coil interposed at least in part between said tubular housing and said armature, a conductor joining the first turn of said coil to the last turn, a fixed tap connected to each of said spiral windings to provide means for supplying power to said coil, bearing support means for said armature whereby each pole piece is separated from said core by a relatively small gap, wires connected to said taps and extending outside said tubular housing and a switch; said switch connected to said wires to direct power to selected pairs of said taps.

2. A linear motion electromagnetic machine according to claim 1 wherein each spiral winding is separated from the adjacent spiral windings by a ring made of a ferromagnetic material, each such ring being mounted concentric with said core.

3. A linear motion electromagnetic machine according to claim 2 wherein each ring has a greater thickness at its inside diameter than at its outside diameter.

4. An electromagnetic positioner comprising: a magnetizable frame; an armature of ferromagnetic material movably mounted within said frame; means for generating a magnetic field in said armature; windings at least portions of which are interposed between said frame and said armature; circuit means securing the ends of said windings together, a plurality of taps on said windings selected pairs of which taps when connected to a power source divide said windings into current paths creating opposed magnetic fields; and means for connecting selected pairs of said taps to a source of power.

5. The electromagnetic positioner of claim 4 in which the distance between the taps comprising a pair is equal to the length of said armature.

6. The electromagnetic positioner of claim 5 in which said pairs of taps divide said windings into current paths producing substantially equal magnetic fields.

7. The electromagnetic positioner of claim 4 in which said pairs of taps divide said windings into current paths producing substantially equal magnetic fields.

8. The electromagnetic positioner of claim 4 in which said magnetizable frame comprises a pair of spaced parallel legs, said windings are divided between said magnetic legs, and said armature comprises a magnet arranged with its poles adjacent said frame legs, one tap of each pair on the windings on one frame leg and the other on the opposite frame leg.

9. The electromagnetic positioner of claim 8 in which said pairs of taps divide said windings into current paths producing substantially equal magnetic fields.

10. An electromagnetic positioner comprising: a magnetizable frame; an armature of ferromagnetic material movably mounted within said frame; means for generating a magnetic field in said armature; windings at least portions of which are interposed between said frame and said armature; a plurality of taps on said windings selected pairs of which taps when connected to a power source provide a magnetic field in said windings at a predetermined location; ferromagnetic washers interposed between said windings at said taps; and means for connecting selected pairs of said taps to a source of power.

11. The electromagnetic positioner of claim 10 in which a circuit means connects the ends of said windings and said selected pairs of taps divide said windings as to create opposed magnetic fields when energized.

12. The electromagnetic positioner of claim 11 in which said opposed magnetic fields are substantially equal.

13. The electromagnetic positioner of claim 12 in which the distance between the taps making up a pair is equal to the distance between the ends of the armature.

14. Electromagnetic positioner of claim 10 in which the distance between taps comprising a pair is equal to the distance between the ends of the armature.

15. An electromagnetic positioner comprising: a magnetizable frame; an armature of ferromagnetic material movably mounted within said frame; means for generating a magnetic field in said armature; windings at least portions of which are interposed between said frame and said armature; a circuit means securing the ends of said windings together; a plurality of taps on said windings selected pairs of which taps when connected to a power source divide said windings into current paths creating opposed magnetic fields; structure operatively associated with one of said windings and said armature to concentrate the magnetic field leaving and entering said armature; and means for connecting selected pairs of said taps to a source of power.

16. Electromagnetic positioner of claim 15 in which said magnetizable frame comprises a pair of spaced parallel legs, said armature having magnetic poles; and said means for concentrating the magnetic field leaving and entering said armature comprises positioning said armature with its magnetic poles adjacent said frame legs.

17. The electromagnetic positioner of claim 16 in which said opposed magnetic fields are of substantially equal magnetic force.

18. The electromagnetic positioner of claim 15 in which said opposed magnetic fields are substantially of equal magnetic force.

19. The electromagnetic positioner of claim 15 in which there is structure operatively associated with both said armature and said windings to concentrate the magnetic field leaving and entering said armature.

20. The electromagnetic positioner of claim 19 in which said structure for concentrating the magnetic field leaving and entering said armature and associated with said winding comprises ferromagnetic washers interposed at said taps and the structure associated with said core for concentrating the lines of magnetic force leaving and entering said armature comprises having said armature spool shaped.

21. An electromagnetic positioner comprising: a magnetizable frame having a tubular exterior and a core concentrically arranged within said tubular frame; a circular armature movably mounted within said magnetizable frame and loosely embracing said core and smaller than the internal dimensions of the tubular portions of said magnetizable frame, connecting rods secured to said circular armature journaled for a motion to and fro within said frame; means for generating a magnetic field in said armature; windings on said frame at least portions of which are interposed between said frame and said armature; circuit means securing the ends of said windings together; a plurality of taps on said windings selected pairs of which taps when connected to a power source provide said windings with current creating opposed magnetic fields; and means for connecting selected pairs of said taps to a source of power.

22. The electromagnetic positioner of claim 21 in which the opposed fields created by connecting pairs of taps to a source of power are substantially equal in force.

23. An electromagnetic positioner comprising: a magnetizable frame; an armature of ferromagnetic material journalled for motion within said frame; means for generating a magnetic field in said armature; windings at least portions of which are interposed between said frame and said armature; a jumper securing the ends of said windings together; a plurality of taps on said windings selected pairs of which taps when connected to a power source divide said windings into current paths creating opposed magnetic fields; means for connecting selected pairs of said taps to a source of power; variable resistors connected to said means for connecting selected pairs of taps to a source of electrical energy; and a second means for connecting selected pairs of taps to the same source of electrical energy electrically connected to the first of such means via said variable resistors; said second means for connecting selected pairs of taps to the same source of electrical energy being mechanically linked to said first mentioned such means as to be moved therewith and always contact selected pairs of taps spaced from the taps contacted by said first mentioned such means.

24. The electromagnetic positioner of claim 10 in which said magnetizable frame comprises a pair of spaced parallel legs, said windings are divided between said magnetic legs, and said armature comprises a magnet arranged with its poles adjacent said frame legs, one tap of each pair on the windings on one frame leg and the other on the opposite frame leg.

References Cited in the file of this patent
UNITED STATES PATENTS

| | | |
|---|---|---|
| 405,194 | Williams | June 11, 1889 |
| 433,381 | Williams | July 29, 1890 |
| 2,054,806 | Bush | Sept. 22, 1936 |
| 2,310,185 | Weyandt | Feb. 2, 1943 |
| 2,598,994 | Gougeon | June 3, 1952 |
| 2,989,666 | Brenner | June 20, 1961 |
| 3,024,374 | Stauder | Mar. 6, 1962 |

FOREIGN PATENTS

| | | |
|---|---|---|
| 285,089 | Great Britain | May 10, 1929 |
| 742,725 | France | Jan. 4, 1933 |
| 730,683 | Germany | Jan. 15, 1943 |

OTHER REFERENCES

Publication: AIEE Conference Paper, Linear Rate Generator, Paper No. CP–58–799, 7 pages, A.R.M. of R.